US012621332B2

(12) United States Patent
Morag et al.

(10) Patent No.: US 12,621,332 B2
(45) Date of Patent: May 5, 2026

(54) STATIC VULNERABILITY ANALYSIS TECHNIQUES

(71) Applicant: Noname Gate Ltd., Tel Aviv-Jaffa (IL)

(72) Inventors: Aner Morag, Tel Aviv (IL); Tomer Roizman, Tel Aviv-Jaffa (IL); Dor Dankner, Tel Aviv (IL); Shay Levi, Tel Aviv (IL); Oz Golan, Ramat Gan (IL); Hila Zigman, Ramat Gan (IL); Oren Shpigel, Tel Aviv (IL); Netanel Maman, Mazkeret Batya (IL); Yuval Alkalai Tavori, Ramat Gan (IL)

(73) Assignee: Akamai Technologies, Inc., Cambridge, MA (US)

( * ) Notice: Subject to any disclaimer, the term of this patent is extended or adjusted under 35 U.S.C. 154(b) by 301 days.

(21) Appl. No.: 17/823,868

(22) Filed: Aug. 31, 2022

(65) Prior Publication Data

US 2023/0199016 A1 Jun. 22, 2023

Related U.S. Application Data

(63) Continuation-in-part of application No. 17/645,165, filed on Dec. 20, 2021.

(51) Int. Cl.
*H04L 9/40* (2022.01)

(52) U.S. Cl.
CPC ............................... *H04L 63/1433* (2013.01)

(58) Field of Classification Search
CPC . H04L 63/1433; H04L 63/1425; H04L 63/20; G06F 16/9024; G06F 21/577
See application file for complete search history.

(56) References Cited

U.S. PATENT DOCUMENTS 8,321,944 B1 * 11/2012 Mayer ................. H04L 63/1433
726/25
8,745,641 B1 6/2014 Coker
(Continued)

FOREIGN PATENT DOCUMENTS

| EP | 3422665 A1 | 1/2019 |
| EP | 3427179 B1 | 8/2019 |
| JP | 2018518762 A | 7/2018 |

OTHER PUBLICATIONS

"Azure Machine Learning Anomaly Detection API—Team Data Science Process", Microsoft Docs, 2021.
(Continued)

*Primary Examiner* — Benjamin E Lanier
*Assistant Examiner* — Felicia Farrow
(74) *Attorney, Agent, or Firm* — David H. Judson

(57) ABSTRACT

A system and method for static analysis. A method includes accessing a cloud component in order to obtain configurations including sets of instructions used for routing to computing interfaces, wherein the cloud component is used to route requests to a plurality of computing interfaces. Dependencies of the computing interfaces are identified by scanning each of the configurations, where each dependency is a reliance by the computing interface on a service provided by another component in a computing environment and the dependencies are identified by applying dependency identification rules with respect to at least one type of resource implemented in each computing interface. Paths are determined based on the identified dependencies, where each path includes at least one of the computing interfaces through which requests are routed. A vulnerability is detected among the computing interfaces based on the determined paths.

19 Claims, 8 Drawing Sheets

(56) References Cited

U.S. PATENT DOCUMENTS

| | | | |
|---|---|---|---|
| 8,931,101 | B2 | 1/2015 | Baluda et al. |
| 9,853,996 | B2 | 12/2017 | Eliyahu et al. |
| 9,973,484 | B2 | 5/2018 | Reid et al. |
| 10,116,674 | B2 | 10/2018 | Baradaran et al. |
| 10,270,788 | B2 | 4/2019 | Faigon et al. |
| 10,372,702 | B2 | 8/2019 | Harsha et al. |
| 10,681,012 | B2 | 6/2020 | Subbarayan et al. |
| 11,153,339 | B1 | 10/2021 | Kapoor et al. |
| 11,200,144 | B1 | 12/2021 | Cook et al. |
| 2005/0005162 | A1 | 1/2005 | Oliphant |
| 2014/0201838 | A1 | 7/2014 | Varsanyi et al. |
| 2014/0237534 | A1 | 8/2014 | Salinger et al. |
| 2015/0358344 | A1* | 12/2015 | Mumcuoglu ......... G06F 21/552 726/23 |
| 2016/0308729 | A1* | 10/2016 | Choi ..................... H04L 43/026 |
| 2016/0308900 | A1 | 10/2016 | Sadika et al. |
| 2018/0270109 | A1 | 9/2018 | Hollis |
| 2018/0321996 | A1 | 11/2018 | Riva et al. |
| 2019/0147300 | A1 | 5/2019 | Bathen et al. |
| 2020/0067948 | A1 | 2/2020 | Baradaran et al. |
| 2020/0076837 | A1 | 3/2020 | Ladnai et al. |
| 2020/0304470 | A1 | 9/2020 | Subbarayan et al. |
| 2020/0409715 | A1* | 12/2020 | Balasubramanian ........................ G06F 11/3065 |
| 2021/0099478 | A1* | 4/2021 | Seetharamaiah ....... H04L 63/14 |
| 2022/0006829 | A1* | 1/2022 | Nikam ................ G06F 9/44505 |
| 2022/0329616 | A1 | 10/2022 | O'hearn et al. |

OTHER PUBLICATIONS

International Search Report for PCT/IB2022/062401, dated Apr. 3, 2023. International Bureau of WIPO.
International Search Report for PCT/IB2022/062403, dated Mar. 28, 2023. International Bureau of WIPO.
Written Opinion of the Searching Authority for PCT/IB2022/062401, dated Apr. 3, 2023. International Bureau of WIPO.
Written Opinion of the Searching Authority for PCT/IB2022/062403, dated Mar. 28, 2023. International Bureau of WIPO.

* cited by examiner

STATIC VULNERABILITY ANALYSIS TECHNIQUES

CROSS-REFERENCE TO RELATED APPLICATIONS

This application is a continuation-in-part of U.S. patent application Ser. No. 17/645,165 filed on Dec. 20, 2021, now pending, the contents of which are hereby incorporated by reference.

TECHNICAL FIELD

The present disclosure relates generally to cybersecurity for computing interfaces, and more specifically to detecting vulnerabilities among computing interfaces via static analysis.

BACKGROUND

The vast majority of cybersecurity breaches can be traced back to an issue with a computer interface such as an application programming interface (API). API abuses are expected to become the most frequent attack vector in the future, and insecure APIs have been identified as a significant threat to cloud computing.

An API is a computing interface. A computing interface is a shared boundary across which two or more separate components of a computer system exchange information. Computing interfaces therefore allow disparate computing components to effectively communicate with each other despite potential differences in communication format, content, and the like. An API defines interactions between software components.

In modern computing architectures, the backend acts like a direct proxy for data. As a result, a flawed API can lead to exposure of sensitive data, account takeovers, and even denial of service (DOS) attacks. As a result, securing APIs is a top priority of many computing services providers.

Some existing solutions for detecting API abuse have been created. These solutions typically look at communications between a computing architecture and one or more external systems through an API to detect abnormal traffic. These solutions face challenges in adapting to new and constantly evolving threats. Techniques for improving accuracy of abnormality detection and more flexibly adapting to threats are always desirable.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for static analysis. The method comprises: accessing a cloud component in order to obtain a plurality of configurations, wherein the cloud component is used to route requests to a plurality of computing interfaces, wherein the plurality of configurations includes at least one set of instructions used for routing to at least one of the plurality of computing interfaces; identifying dependencies of the plurality of computing interfaces by scanning each of the plurality of configurations, wherein each dependency is a reliance by the computing interface on a service provided by another component in a computing environment, wherein the dependencies are identified by applying dependency identification rules with respect to at least one type of resource implemented in each computing interface; determining at least one path based on the identified dependencies, wherein each path includes at least one of the plurality of computing interfaces through which requests are routed; and detecting a vulnerability among the plurality of computing interfaces based on the determined at least one path.

Certain embodiments disclosed herein also include a non-transitory computer readable medium having stored thereon causing a processing circuitry to execute a process, the process comprising: accessing a cloud component in order to obtain a plurality of configurations, wherein the cloud component is used to route requests to a plurality of computing interfaces, wherein the plurality of configurations includes at least one set of instructions used for routing to at least one of the plurality of computing interfaces; identifying dependencies of the plurality of computing interfaces by scanning each of the plurality of configurations, wherein each dependency is a reliance by the computing interface on a service provided by another component in a computing environment, wherein the dependencies are identified by applying dependency identification rules with respect to at least one type of resource implemented in each computing interface; determining at least one path based on the identified dependencies, wherein each path includes at least one of the plurality of computing interfaces through which requests are routed; and detecting a vulnerability among the plurality of computing interfaces based on the determined at least one path.

Certain embodiments disclosed herein also include a system for static analysis. The system comprises: a processing circuitry; and a memory, the memory containing instructions that, when executed by the processing circuitry, configure the system to: access a cloud component in order to obtain a plurality of configurations, wherein the cloud component is used to route requests to a plurality of computing interfaces, wherein the plurality of configurations includes at least one set of instructions used for routing to at least one of the plurality of computing interfaces; identify dependencies of the plurality of computing interfaces by scanning each of the plurality of configurations, wherein each dependency is a reliance by the computing interface on a service provided by another component in a computing environment, wherein the dependencies are identified by applying dependency identification rules with respect to at least one type of resource implemented in each computing interface; determine at least one path based on the identified dependencies, wherein each path includes at least one of the plurality of computing interfaces through which requests are routed; and detect a vulnerability among the plurality of computing interfaces based on the determined at least one path.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
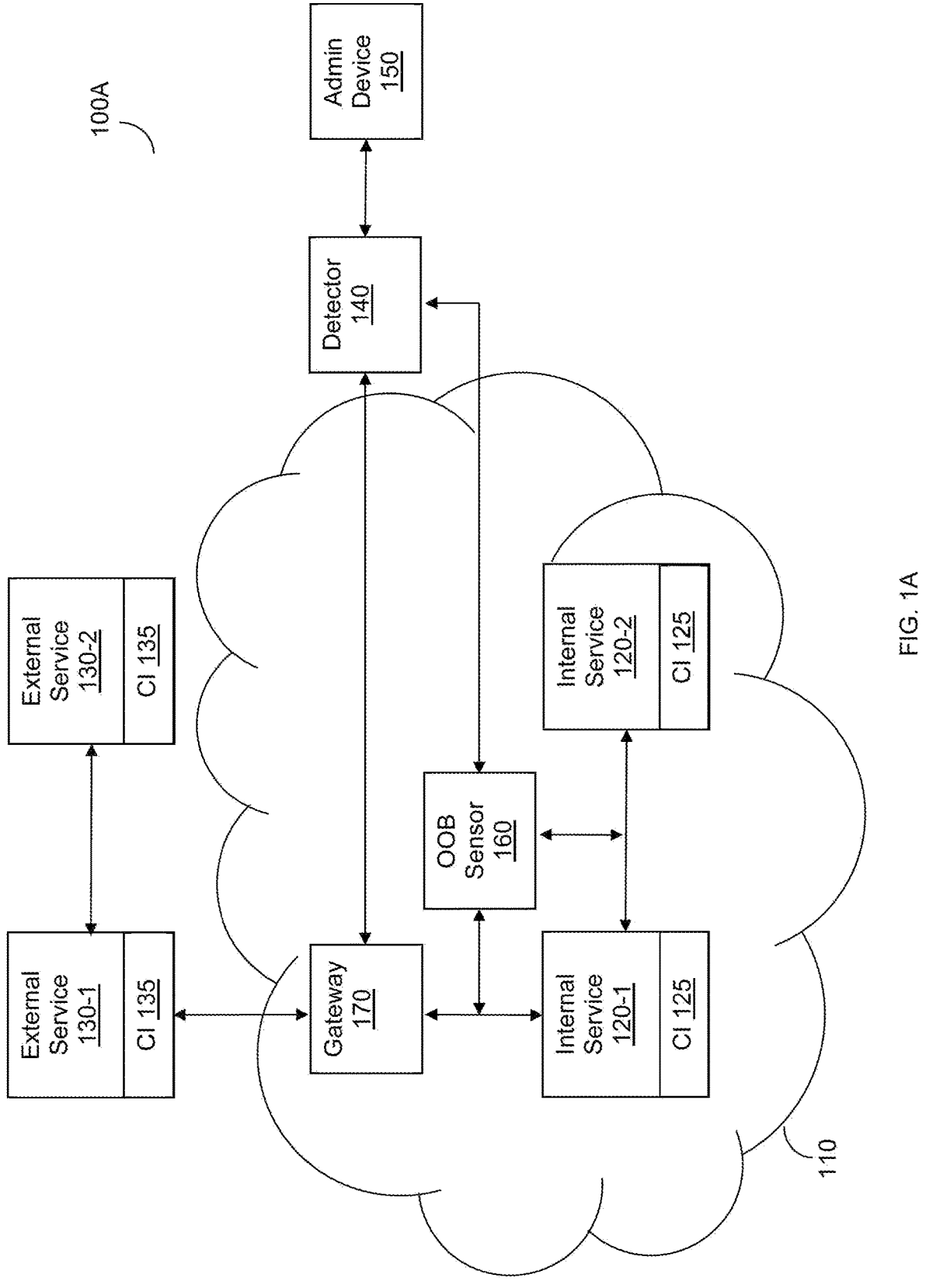
FIGS. 1A-1C are network diagrams utilized to describe various disclosed embodiments.

The various disclosed embodiments include methods and systems for static analysis of computing interfaces as well as for detecting vulnerabilities in computing interfaces using static analysis. The disclosed embodiments can be utilized to detect vulnerabilities which might be caused by misconfigurations of computing interfaces such as, but not limited to, Application Programming Interfaces (APIs).

In an embodiment, routing configurations related to computing interfaces such as APIs are obtained via a cloud component used for routing requests and responses to computing interfaces such as a computing interface gateway (e.g., an API gateway). Obtaining the routing configurations from a gateway may include, but is not limited to, using gateway credentials of the gateway to access routing configurations via the gateway and scanning the accessed routing configurations using a scanner created for that gateway to scan the routing configurations in order to identify dependencies of computing interfaces connected to the gateway. Dependency paths of the computing interfaces are determined based on the identified dependencies.

Traffic into and out of the gateway is correlated to the identified dependencies in order to allow for determining whether the actual flows of traffic match the flows which would be expected based on the dependency paths. A utilization status of each dependency may be determined in order to provide insights into current usage of the dependencies. Vulnerabilities are detected with respect to the computing interfaces. For example, vulnerabilities may be detected based on flows, dependencies, code, or combinations thereof. Mitigation actions may be performed with respect to the detected vulnerabilities in order to avoid or mitigate cyber threats which may be posed by those vulnerabilities.

The disclosed embodiments may be utilized to identify various vulnerabilities which might be caused by misconfiguration of computing interfaces and, in particular, misconfigurations related to dependencies between computing interfaces. As one specific example, the disclosed embodiments may be utilized to ensure that all dependencies of computing interfaces in active use are utilizing a current version and are operating as would be expected based on connections between and among those dependencies.

In this regard, it is noted that rules could be declared and applied via API gateways in order to define how an API should be executed by the gateway. However, these predefined rules, which are focused on behavior of the gateway and do not account for the actual relationships between computing interfaces that are interconnected via the gateway, can result in conflicts or logical gaps (e.g., a rule that does not apply to certain APIs solely because of a logical gap even though the rule is intended to apply to that kind of API). These conflicts or logical gaps can result in unauthenticated APIs, lack of validation on schemas, or failure to validate input values before granting access to APIs. To this end, the disclosed embodiments provide various techniques which allow for automatically analyzing configurations of gateways in order to enforce policies that are specific to particular configurations and connections among computing interfaces, thereby allowing for more accurately identifying misconfigurations (and therefore potential vulnerabilities) than solutions which utilize predetermined rules defining permissible gateway behavior.

The disclosed embodiments may be utilized to provide real-time protection and traffic analysis in computing environments with respect to computing interfaces used by components deployed in those computing environments. This real-time protection and traffic analysis is further improved over solutions utilizing predefined rules to dictate gateway behavior, thereby improving security of computing environments in which the disclosed techniques are utilized. Further, the disclosed embodiments can allow for scanning routing configurations related to computing interfaces and their dependencies in a code-agnostic manner, thereby allowing for identifying potential vulnerabilities regardless of the coding language used for each computing interface.

Additionally, various disclosed embodiments allow for unearthing dependencies using data accessible via gateways, which can be utilized to aid in providing computing interface posture management for a computing environment. More specifically, the dependencies may be used to provide more granular details about the posture of the computing environment, thereby allowing for more accurately enforcing policies and for defining policies more granularly to further improve security when those policies are enforced.

In some embodiments, traffic related to communications between computing interfaces may be duplicated, and the duplicated traffic may be compared to flows among dependencies of computing interfaces in order to detect misconfigurations or otherwise detect potential vulnerabilities. In a further embodiment, duplicating the traffic includes extracting data from each layer used for the communications, where at least a portion of the data extracted from one layer may be utilized to build a higher layer. The data extracted from each layer may include, but is not limited to, data utilized for building a higher layer, metadata utilized for subsequent processing and analysis, both, and the like. In yet a further embodiment, the data extracted from each layer excludes any protocol-specific data.

Duplicating the traffic may further include building each layer above the lowest layer based on data extracted from lower layers. In some embodiments, duplicating the traffic may further include performing a full session reconstruction in order to reconstruct a communications session such that it includes all request-response pairs of the communications session. The extracted data may be utilized to duplicate the traffic in a unified data modeling format which is protocol-agnostic, i.e., such that the duplicated traffic does not include any protocol-specific data and the subsequent analysis is not affected by the type of protocol used for the communications.

In this regard, it has been identified that, although some existing solutions utilizing traffic mirroring exist, these solutions are limited in their ability to duplicate various types of traffic. In particular, some existing solutions can duplicate traffic related to APIs that an organization exposes to external services and systems. However, these solutions cannot effectively duplicate intra-organization traffic (i.e., traffic used by computing interfaces or traffic between computing interfaces of services the organization consumers (i.e., services which are external to a network environment of the organization).

Some cloud and other computing service providers currently provide data about communications between endpoints within a given network such that there is a wealth of data available. However, this data is often incomplete and therefore cannot be effectively utilized to detect anomalies based on API communications as originally created. To this end, it has been identified that performing packet mirroring by reconstructing traffic can be used to generate more complete interface communications data and, therefore, more accurately detect vulnerabilities based on discrepancy between the reconstructed traffic and flows in dependencies of computing interfaces. Further, by providing full reconstructions of traffic, the disclosed embodiments can be utilized to allow for enforcement of policies with respect to computing interface communications with more options than existing solutions.

The disclosed embodiments provide techniques for traffic duplication which can duplicate various types of traffic such as intra-organization traffic, traffic between external computing interfaces, and traffic related to computing interfaces exposed by an organization to external services and systems. The disclosed embodiments can leverage network traffic data that may be provided by cloud providers or other network operators in order to duplicate the various types of traffic without requiring intercepting the traffic or otherwise interfering with normal or otherwise baseline communications. More specifically, the disclosed embodiments provide techniques allowing for reconstructing such traffic based on computing interface data. By allowing for analysis of all of these kinds of traffic, the disclosed embodiments can effectively access more data, thereby permitting for identifying more vulnerabilities than existing solutions and increasing the overall accuracy of vulnerability detection.

Figure 1B:
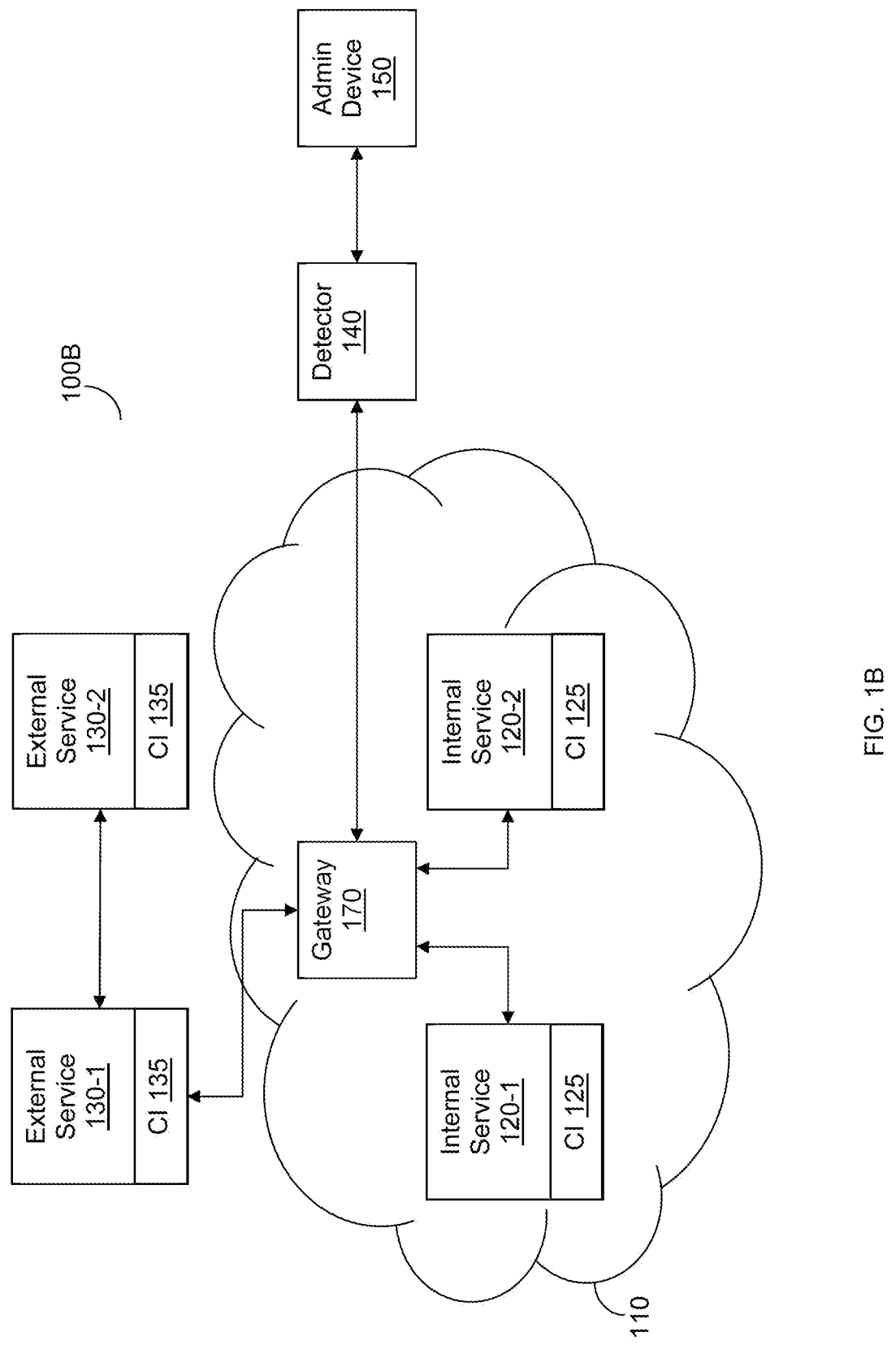
Figure 1C:
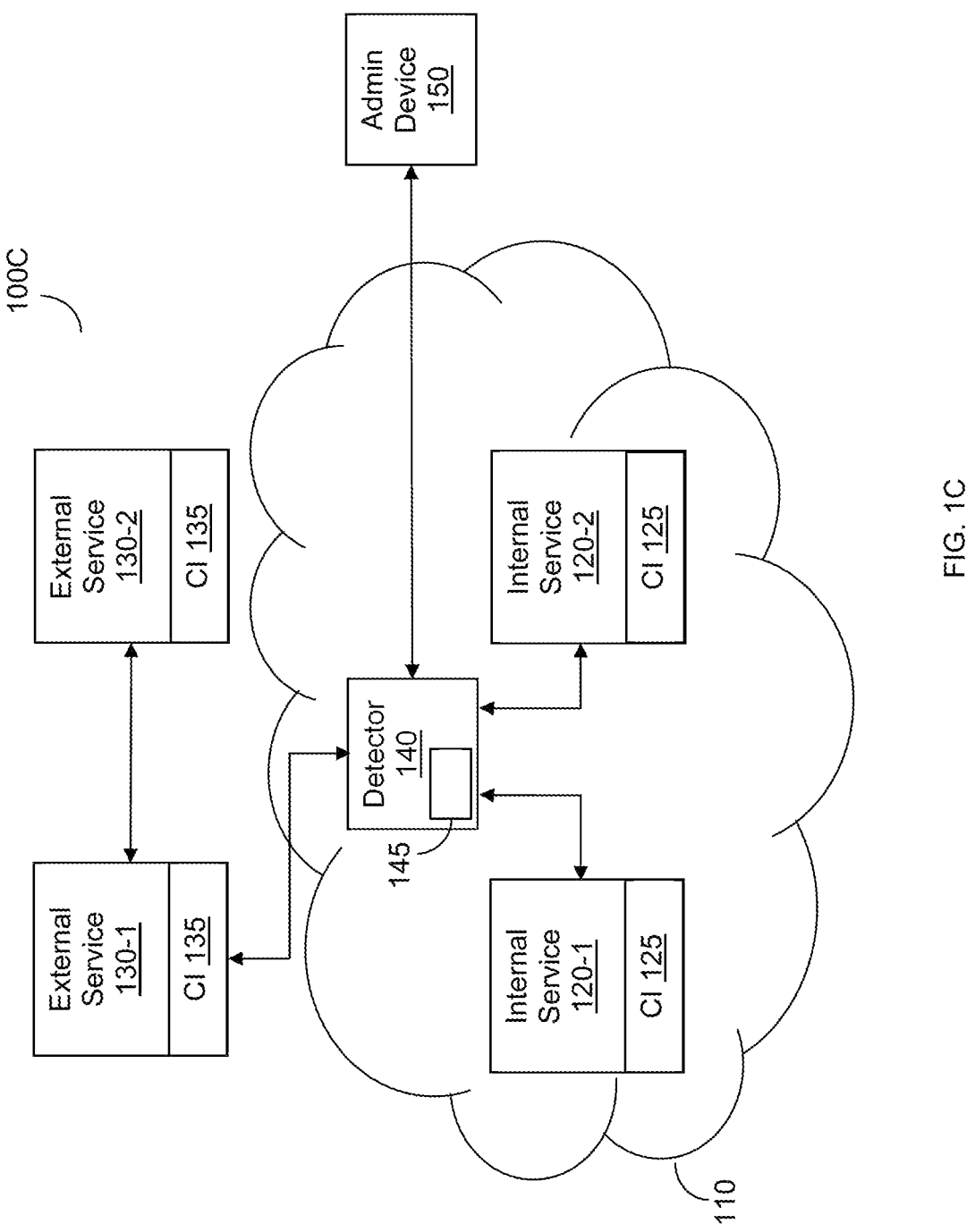

FIGS. 1A-C show example network diagrams 100A-C utilized to describe the various disclosed embodiments. In each of FIGS. 1A-C, internal services 120-1 and 120-2 (which may be referred to individually as an internal service 120 or collectively as internal services 120) communicate with each other and/or with external services 130-1 and 130-2 (which may be referred to individually as an external service 130 or collectively as external services 130). The internal services 120-1 and 120-2 are services hosted on a network 110. Each of the internal services 120 communicates at least using a respective communications interface (CI) 125 and each of the external services 130 communicates at least using a respective communications interface (CI) 135. The communication interfaces 125 and 135 may be, but are not limited to, Application Programming Interfaces (APIs).

The network 110 may be, but is not limited to, a wireless, cellular or wired network, a local area network (LAN), a wide area network (WAN), a metro area network (MAN), the Internet, the worldwide web (WWW), similar networks, and any combination thereof. The network 110 may be operated by an organization (e.g., by including servers owned by the organization), or may be operated by another entity (e.g., a cloud provider or other provider of network computing services). It should be noted that a single network 110 is depicted merely for simplicity purposes, but that the internal services 120 may communicate via multiple networks and/or other connections in accordance with the disclosed embodiments.

FIG. 1A depicts an out of band implementation. In FIG. 1A, an out of band (OOB) sensor 160 is deployed out of path of the communicating services 120 and 130. The out of band sensor 160 is configured to duplicate traffic between the computing interfaces 125 and/or 135, and to send the duplicated traffic to the detector 140 for analysis. The detector 140 may further be configured to access a gateway 170 in order to obtain routing configurations to be utilized as described herein.

FIG. 1B depicts a gateway plugin implementation. In FIG. 1B, a cloud component such as a gateway 170 is deployed in line between the internal services 120 and between the internal service 120-1 and the external services 130-1. The gateway 170 may be, but is not limited to, a computing interface gateway, another kind of gateway, or another cloud component (e.g., a load balancer) used for routing requests and responses within the computing environment including routing requests to computing interfaces, through computing interfaces (e.g., routing to a computing interface for forwarding elsewhere), or both. The gateway 170 is configured to receive requests and responses from any of the services 120 and/or 130, and to forward those requests and responses to appropriate destinations. The gateway 170 may be further configured to enforce one or more policies with respect to traffic. In the example implementation shown in FIG. 1B, the gateway 170 is configured to send a copy of each request and response to the detector 140 for analysis. When the traffic between the computing interfaces 125 and/or 135 is encrypted, the gateway 170 may be further configured to decrypt the traffic data before transmitting such data to the detector 140.

The gateway 170 may be, but is not limited to, an API gateway. In this regard, it is noted that many cloud providers and other network service providers have existing gateways deployed therein for managing traffic. Further, such gateways have tools which allow for accessing configurations which, in turn, can be analyzed in order to determine dependencies of computing interfaces. Accordingly, the disclosed embodiments may utilize existing functionality of such gateways in order to obtain response-request data and routing configurations to be utilized as described herein.

FIG. 1C depicts an inline implementation. In FIG. 1C, the detector 140 is deployed in line between the internal services 120 and between the internal service 120-1 and the external services 130-1. The detector 140 is configured to analyze requests and responses as described herein in order to detect anomalies in computing interface data and generate supplemental data. To this end, the detector 140 may include a sensor module 145 configured to duplicate traffic as described herein. The detector 140 may be further configured to integrate one or more gateways (not shown in FIG. 1C) in order to act as a gateway by forwarding requests and responses to appropriate destinations, decrypting traffic, or both.

The detector 140 is configured to detect vulnerabilities as described herein, and may be configured to send data indicating the detected vulnerabilities and/or data used for detecting the vulnerabilities to the admin device 150 for display.

The admin device 150 may be, but is not limited to, a personal computer, a laptop, a tablet computer, a smartphone, a wearable computing device, or any other device capable of receiving and displaying notifications or a graphical user interface including anomaly detection data and/or supplemental data. The admin device 150 may be, but is not limited to, operated by an administrator of the network 110 or other user who may want information regarding computing interface activity and, in particular, vulnerabilities caused by misconfigurations in computing interfaces. In another implementation (not shown in any of FIGS. 1A-C), the detector 140 may be configured to send such data to a cybersecurity tool configured to perform mitigation actions with respect to the internal services 120 and/or the external services 130.

It should be noted that the particular network configurations shown in FIGS. 1A-C are merely utilized to illustrate various example deployments of the detector 140 and that the disclosed embodiments may be applied to other network configurations without departing from the scope of the disclosure. As some particular examples, different numbers of internal services 120, external services 130, or both, may communicate amongst each other, and the detector 140 may be deployed such that it can identify anomalies in any or all such communications. In such implementations, multiple anomaly detectors may be utilized. Additionally, the detector 140 may be implemented as a system (e.g., a server), as a virtual machine, as a software container or other self-contained software package, and the like.

It should also be noted that the detector 140 is depicted as outside of the organization's network 110 in FIGS. 1A-B merely for simplicity purposes, and that the particular location of deployment of the detector 140 may vary in at least some implementations. As non-limiting examples, the detector 140 may be realized as a software-as-a-service (SaaS) managed in a separate cloud environment from the network 110, via accessing a shared cloud account that is also accessible to systems of the network 110, or on premises (e.g., in the network 110 or otherwise in physical or network proximity to the services 120), and the like.

Figure 2:
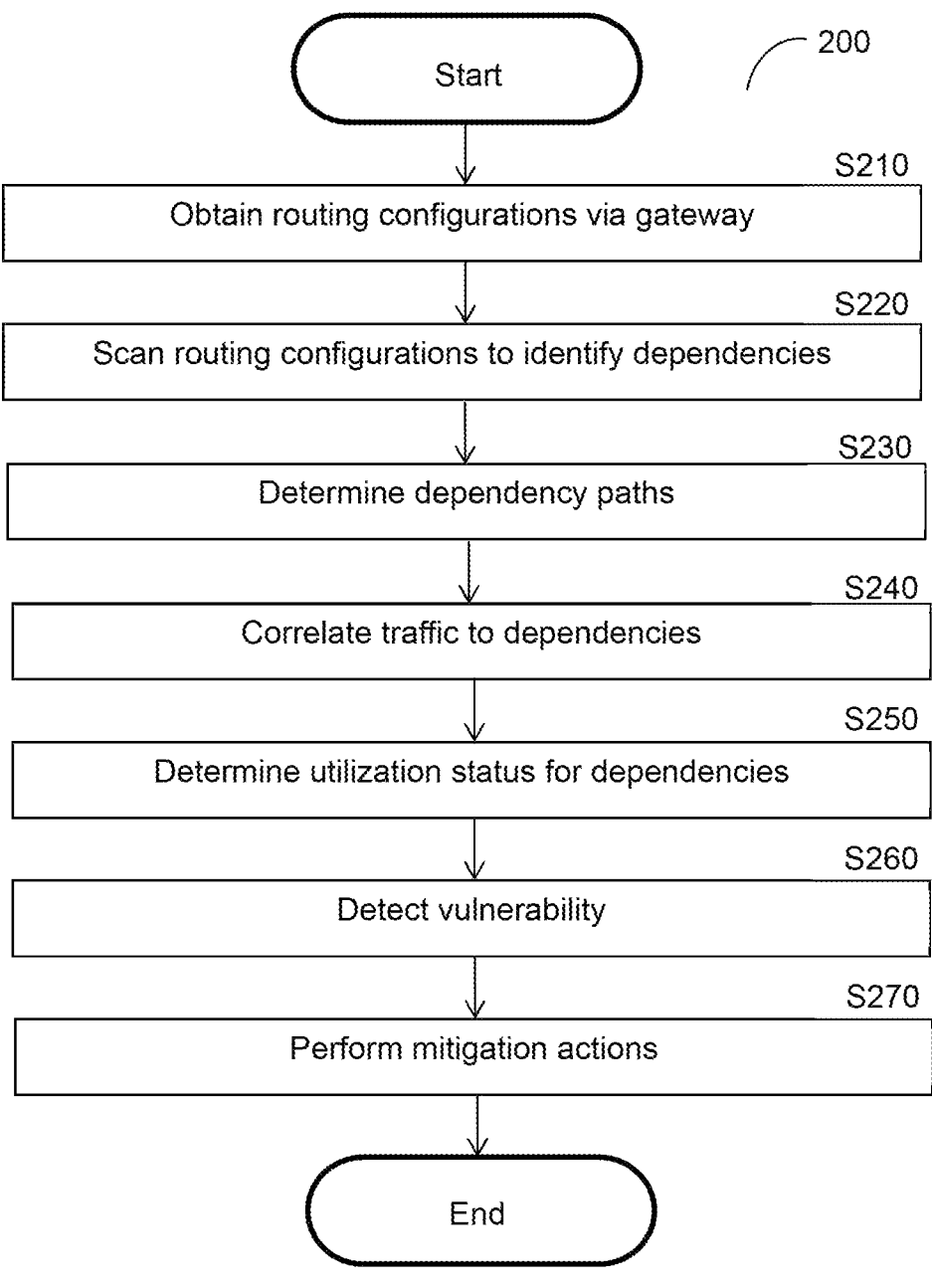
FIG. 2 is a flowchart illustrating a method for detecting vulnerabilities via static analysis of computing interfaces according to an embodiment.

FIG. 2 is an example flowchart 200 illustrating a method for detecting vulnerabilities via static analysis of computing interfaces according to an embodiment. In an embodiment, the method is performed by the detector 140.

At S210, configurations are obtained via one or more computing interface gateways (e.g., the gateway 170 or the detector 140 functioning as a gateway). The obtained configurations are sets of instructions which include, but are not limited to, routing configurations. The routing configurations represent a current cloud configuration of the computing environment and include sets of instructions for routing to the computing interfaces. In an embodiment, S210 includes accessing one or more gateways to obtain routing configurations and using a scanner to scan the routing configurations. In a further embodiment, the routing configurations are obtained from each gateway as described further below with respect to FIG. 3. In an out of band implementation (e.g., the implementation depicted in FIG. 1A), S210 may further include taking a snapshot of the cloud environment and scanning the snapshot.

At S220, the obtained routing configurations are scanned in order to identify dependencies of computing interfaces of the computing environment in which the gateway is deployed. In an embodiment, S220 includes applying dependency identification rules to the obtained routing configurations, where the dependency identification rules define conditions for identifying dependencies. The dependencies of each computing interface may include, but are not limited to, gateways (e.g., API gateways), serverless functions, managed services, unmanaged services (e.g., EC2s, virtual machines, etc.), combinations thereof, and the like.

In a further embodiment, the dependency identification rules applied to each routing configuration differ depending on the type of resource implemented in the computing interface corresponding to the routing configuration. To this end, in yet a further embodiment, S220 includes identifying resources implemented in the computing interfaces involved in the routing configurations (e.g., computing interfaces that send data to or receive data from the gateway as indicated in the routing configurations) and determining a type of resource for each identified resource. As a non-limiting example, each computing interface may be checked to see if it has an application implemented therein and, if so, a type of application (e.g., a node application, a Java application, etc.) is determined. The set of dependency rules applied to the routing configuration may therefore depend on the determined type of resource (e.g., whether the resource is a node application or a Java application).

At S230, dependency paths among the identified dependencies of the computing interfaces are determined. The dependency paths provide the full chain of dependencies beginning at each computing interface and including any dependencies of the computing interface or of dependencies of the computing interface. These dependency paths therefore reflect flows between dependencies that are expected to occur when computing interfaces are utilized such that traffic At S240, traffic is correlated to the identified dependencies in order to determine whether the actual traffic matches the flows represented in the dependencies. The correlated traffic may be, for example, traffic to a back end server (e.g., a server deployed within the computing environment in which the gateway is also deployed).

In an embodiment, S240 includes correlating between flows involving the computing interface caused by the identified dependencies and traffic of components in the computing environment in order to determine whether the traffic reflects the traffic which would be expected based on the flows in dependencies from the computing interfaces, correlating between flows caused by the identified dependencies and hostile traffic in the computing environment in order to determine whether the hostile traffic is directed to a vulnerable component in the computing environment, or both. As noted below, if the traffic flows do not match the expected flows or if hostile traffic correlates to flows in the dependencies, the computing interfaces may be vulnerable. Additionally, if an attack reflected in hostile traffic is determined to be directed to a potentially vulnerable resource (e.g., based on a known potential vulnerability in that resource), the computing interface may be determined to be vulnerable.

In an embodiment, the traffic that is correlated to the dependencies may be obtained, for example, as described below with respect to FIG. 5. More specifically, in a further embodiment, traffic is duplicated in order to provide access to the traffic. Further description of duplicating traffic may be found in the above-referenced U.S. patent application Ser. No. 17/645,165, assigned to the common assignee, the contents of which are hereby incorporated by reference.

At S250, a utilization status is determined for each of the computing interface dependencies. In an embodiment, S250 includes mapping connections between computing interfaces and their respective dependencies in order to determine whether each dependency is being actively utilized (utilization status=active) or not (utilization status=inactive). For example, a utilization status of a dependency may be active when a computing interface that is currently used in the computing environment depends on that dependency, and the utilization status is inactive when no currently used computing interfaces depend from that dependency. In some embodiments, the utilization statuses of the dependencies are determined as described further below with respect to FIG. 4.

At S260, one or more vulnerabilities are detected with respect to the computing interfaces. The detected vulnerabilities may include, but are not limited to, vulnerabilities reflected in flows among computing interfaces, vulnerabilities reflected in dependencies of computing interfaces (e.g., in utilization statuses of dependencies of each computing interface), vulnerabilities reflected in code of computing interface (e.g., in code blocks), combinations thereof, and the like.

In an embodiment, detecting the vulnerabilities with respect to dependencies includes checking for vulnerabilities in the dependencies themselves, checking for vulnerabilities based on utilization of those dependencies with respect to a current configuration of the computing environment (e.g., a current cloud configuration), or both. For example, if a computing interface is determined to be vulnerable based on correlations between traffic and flows among dependencies of the computing interface, a vulnerability is detected for that computing interface. Additionally, if the utilization status of a dependency of the computing interface is determined as inactive (i.e., not being utilized and therefore potentially lacking security critical updates), a vulnerability is detected.

At S270, one or more mitigation actions are performed with respect to the detected vulnerabilities. The mitigation actions may include, but are not limited to, blocking traffic to and from computing interfaces having vulnerabilities, reconfiguring the vulnerable computing interfaces (e.g., by changing a configuration that does not require authentication to a configuration that does require authentication or by placing a web application firewall configuration in front of an API server), generating a notification including a recommendation to reconfigure the component using the computing interface, combinations thereof, and the like.

Figure 3:
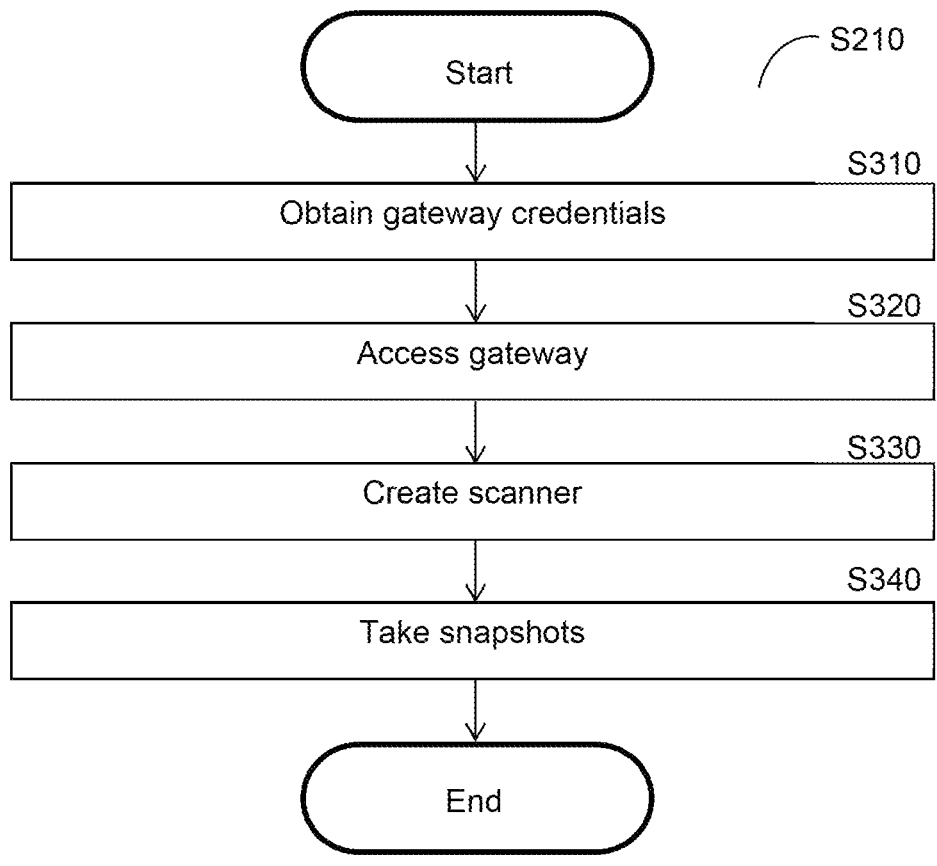
FIG. 3 is a flowchart illustrating a method for obtaining routing configurations via cloud components used for routing to computing interfaces according to an embodiment.

FIG. 3 is an example flowchart S210 illustrating a method for obtaining routing configurations via computing interface gateways according to an embodiment.

At S310, gateway credentials are obtained for a gateway. The gateway credentials may be received from or otherwise provided by a user (e.g., an admin of the organization that operates a particular computing environment). To this end, the gateway credentials may be received (e.g., from an admin device such as the admin device 150) or retrieved from a storage.

At S320, the gateway is accessed using the gateway credentials. In an embodiment, accessing the gateway may include integrating the gateway (e.g., integrating the gateway in a detector such as the detector 140). The gateway is accessed at least in order to retrieve routing configurations to be scanned.

At S330, a scanner is created for the gateway. The scanner is created in order to scan routing configurations of the gateway so as to allow for retrieving code of the gateway and of dependencies of the gateway. More specifically, the scanner may be created based on a type of gateway. To this end, the created scanner is configured to use techniques to scan routing configurations from the gateway that correspond to the type of the gateway.

At optional S340, one or more snapshots are taken. Each snapshot is a data at rest copy of a respective disk, i.e., the data of each snapshot is an inactive copy of the data including the routing configurations which can be scanned in order to identify dependencies. In an embodiment, a snapshot is taken for each disk among disks being used to host computing resources which serve the computing interfaces managed by the gateway. A snapshot may be taken, for example, when the detector being used to detect vulnerabilities is deployed out of band of the gateway and the computing interfaces (e.g., as depicted in FIG. 1A).

It should be noted that FIG. 3 is described with respect to obtaining routing configurations from a single gateway, but that the process may be extended to obtaining configurations from multiple gateways without departing from the scope of the disclosure. For example, multiple instances of the process of FIG. 3 may be executed in series or in parallel, with each instance being executed for a respective gateway.

Figure 4:
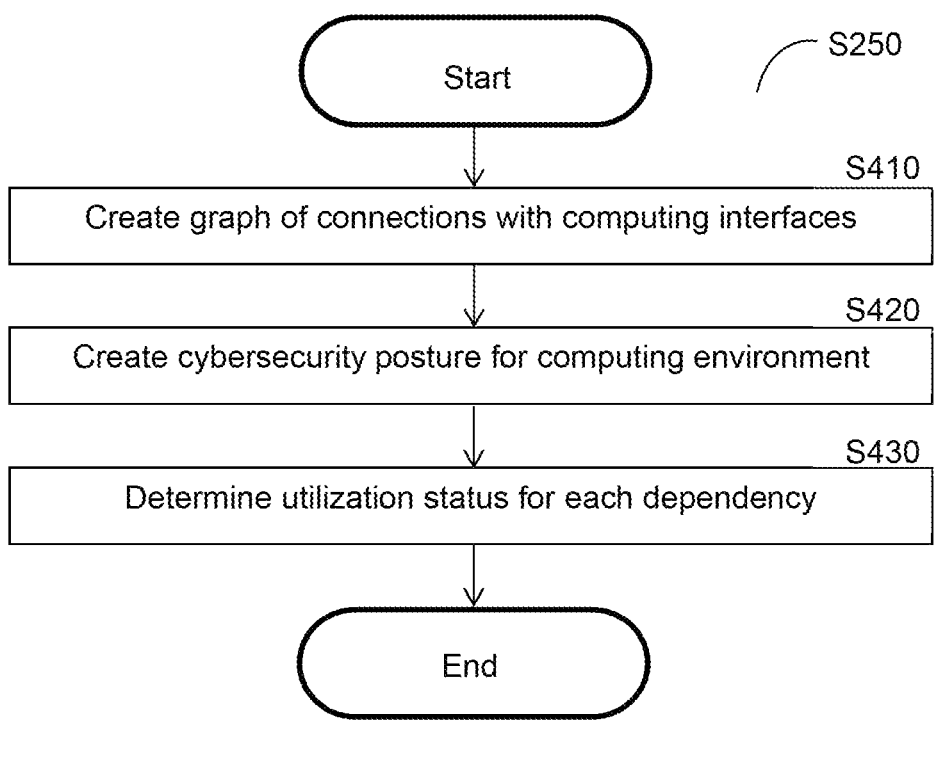
FIG. 4 is a flowchart illustrating a method for determining utilization statuses of computing interface dependencies according to an embodiment.

FIG. 4 is an example flowchart S250 illustrating a method for determining utilization statuses of computing interface dependencies according to an embodiment.

At S410, a graph of connections with computing interfaces is created based on routing configurations of a gateway managing the computing interfaces (e.g., the routing configurations obtained as described above). The graph includes at least connections between computing interfaces with their dependencies, and may further include connections between different computing interfaces, between different dependencies, or both.

At S420, a cybersecurity posture is created for the computing environment. The cybersecurity posture may be, but is not limited to, a posture of the computing environment (e.g., the environment realized vi the network 110, FIGS. 1A-C) in which the computing interfaces are deployed or having resources which communicate with the computing interfaces. The posture is a model of at least the computing interfaces used for communications in or with the computing environment, and is used to analyze the setup of the environment and its logical components with respect to cyber threats. To this end, in an embodiment, S420 includes creating or updating the posture at least with respect to the computing interface.

In a further embodiment, the posture managed at S420 is created based on contextual data including both traffic-related configuration parameters and traffic behaviors for the computing interface (e.g., configuration parameters derived from routing configurations and traffic behaviors determined based on traffic flows as noted above). The posture of an environment defines the setup of the environment with respect to these configuration parameters and traffic behaviors, and may further define the setup of the environment with respect to internal communications between logical components of the environment. Moreover, the posture particularly reflects configurations as they relate to computing interfaces and gateways that manage communications between and among the computing interfaces.

In yet a further embodiment, S420 includes creating an inventory (e.g., creating a new inventory or updating an existing inventory) of computing interfaces managed by gateways in the environment for which a posture is being managed by analyzing the configuration parameters and traffic behavior. The posture includes the inventory, which in turn includes any associated data and metadata for the computing interfaces reflected in the inventory. Such an inventory may indicate, for each computing interface, data types handled by the computing interface, whether the computing interface is Internet-facing (i.e., whether the computing interface is directly exposed to the Internet, for example by being used for direct communications with the Internet), whether the computing interface enforces or requires authentication, combinations thereof, and the like. The inventory may further include the dependencies of each computing interface.

Once a portion of the posture related to a particular computing interface is detected, that posture may be utilized in order to identify misconfigurations which might be used to detect potential vulnerabilities. Specifically, the posture includes a combination of relevant configuration parameters and traffic behaviors for any given computing interface. This combination of configuration parameters and traffic behaviors can be analyzed to determine if the combination or a subset of the combination is indicative of a misconfiguration.

By proactively building a posture regardless of whether the environment is being attacked, potential contextual misconfigurations can be more readily determined prior to cyber-attacks, thereby improving security of the environment. Moreover, in addition to misconfigurations, the posture may be utilized to identify potential vulnerabilities which are not necessarily caused by misconfigurations.

At S430, a utilization status is determined for each dependency based on the graph of connections, the cybersecurity posture, or both. In an embodiment, the utilization status for each dependency is either active or inactive. An active dependency may be a dependency that is actively being utilized, e.g., as represented by connection to a computing interface that is currently utilized in the computing environment, either directly connected to that computing interface or indirectly connected through one or more other dependencies of the computing interface. In contrast, an inactive dependency may be a dependency that is not connected to any currently used computing interfaces.

Figure 5:
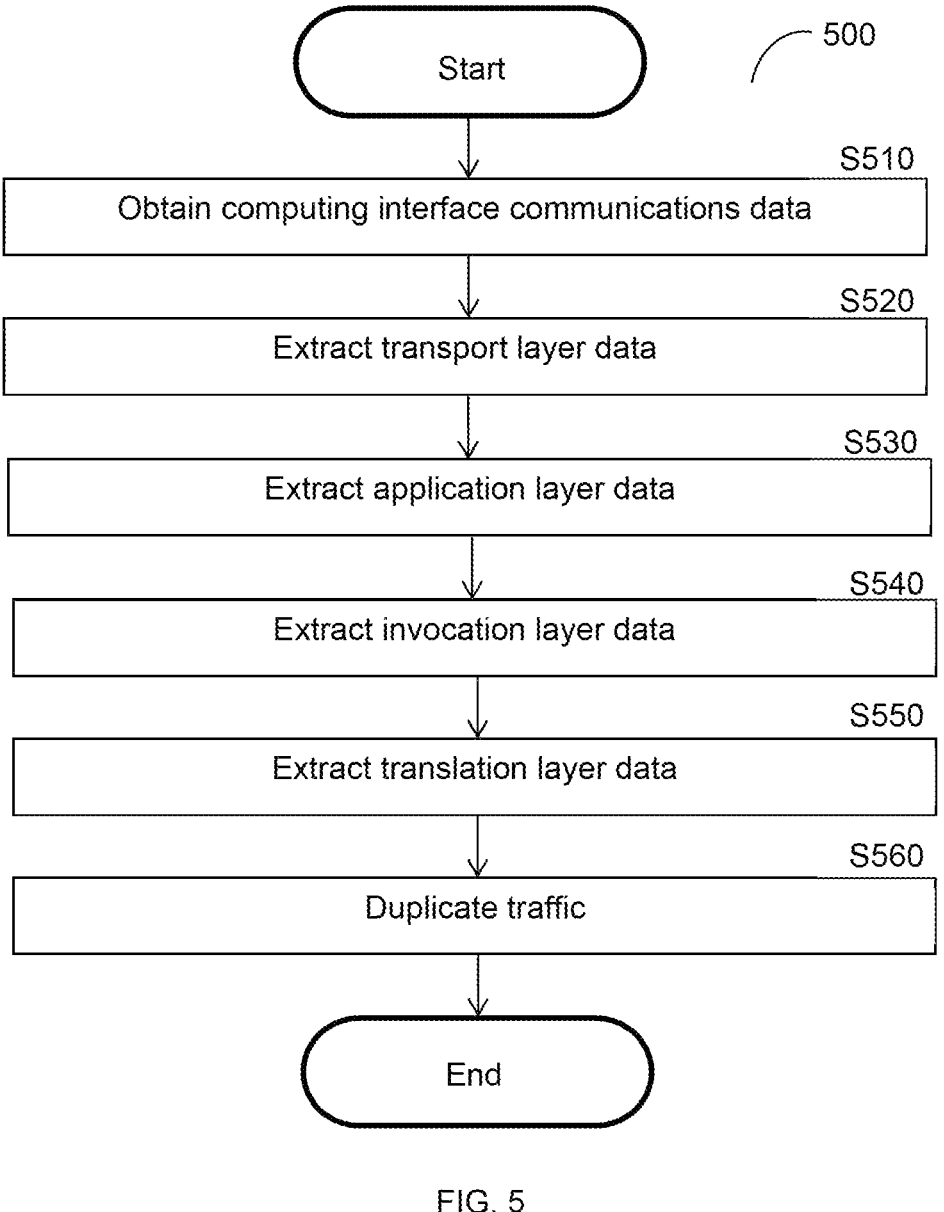
FIG. 5 is a flowchart illustrating a method for duplicating computing interfaces traffic according to an embodiment.

FIG. 5 is an example flowchart 500 illustrating a method for duplicating computing interfaces traffic according to an embodiment. In an embodiment, the method of FIG. 5 is performed by the detector 140 or by the out of band sensor 160. The duplicated traffic may be utilized for vulnerability detection as discussed herein, for example, by correlating the duplicated traffic to flows as described above.

More specifically, the process depicted and described with respect to FIG. 5 can be utilized to create a full session reconstruction based on computing interface communications data which only provides partial data related to the session. To this end, the full session reconstruction may include reconstructing each request-response pair of the session (i.e., each session and the next response sent after each respective session).

At S510, computing interface communications data is obtained. The communications data includes data related to requests, responses, or both, sent between two endpoints via computing interfaces (e.g., the interfaces 120, the interfaces 130, or between an interface 120 and an interface 130) during a communication session. The communications data may be received (e.g., from a gateway or sensor deployed in a network where at least some of the services operate), may be intercepted (e.g., when the system performing the method of FIG. 2 is deployed in line or out of path between the computing interfaces and is capable of accessing communications data transmitted between such computing interfaces), and the like.

At steps S520 through S560, data is extracted from various communication protocol layers used for communication between communications interfaces. For each layer, a respective set of rules for extracting data from that layer is applied to data communicated via that layer in order to extract data from that layer. Further, some of the layers may be built based on the data extracted from other layers. As a non-limiting example, when the layers include a transport layer, an application layer, an invocation layer, and a translation layer, data extracted from the transport layer may be used in building the application layer, data extracted from the application layer may be used in building the invocation layer, and data extracted from the invocation layer may be used in building the translation layer.

The set of rules for each layer defines fields which include data to be extracted regardless of the formatting used for those fields. In a further embodiment, the rules define fields such that data extracted from those fields includes protocol-specific data (i.e., data which is only used for a particular protocol). By only extracting such protocol agnostic data and duplicating the traffic based on that protocol agnostic data, the duplicated traffic itself is protocol agnostic and can be analyzed regardless of the protocol used for the original traffic.

To this end, the set of rules for each layer may include key words or other indicators that uniquely identify headers of particular fields such that, when those indicators are included in a field, it can be determined whether to extract data from that field. Alternatively or collectively, the set of rules for each layer may include applying a machine learning model trained to identify comparable data with respect to training data for that respective layer.

The data extracted for each layer may more specifically include data needed to build higher layers, metadata utilized for use in duplicating the traffic, both, and the like. The set of rules for each layer may further define which fields include data for building higher layers and which fields include metadata.

At S520, data is extracted from a transport layer. Extracting the data from the transport layer may include, but is not limited to, reconstructing communications according to the Transmission Control Protocol (TCP) or other transport layer protocol. To this end, S520 may further include segmenting traffic into different sessions and ordering the packets. The data is extracted from the ordered packets.

At S530, data is extracted from an application layer. Extracting the data from the application layer may include, but is not limited to, parsing Hypertext Transfer Protocol (HTTP) packets. To this end, S530 may further include splitting the packets into sessions, each session made of a request-response pair.

In an embodiment where the system performing traffic duplication is not deployed inline between communications interfaces or otherwise when the system performing traffic duplication does not have access to the raw communications data (e.g., when the system is deployed out of line and receives incomplete communications data from an API gateway that is deployed inline such that the system does not have access to the complete set of request-response pairs), duplicating the traffic may further include performing a full session reconstruction as described further below with respect to FIG. 4. Such a full session reconstruction provides the request-response pairs needed for application layer data extraction.

At S540, data is extracted from an invocation layer. The invocation layer is a layer which includes invocation of functions or paths by a higher layer (e.g., the translation layer). In an embodiment, S540 includes identifying invocations of functions or paths.

Whether to identify invocations of functions or paths may be determined by identifying a type of communication framework (e.g., a type of remote procedure call or software architectural style) used for communications. To this end, the set of rules applied to the invocation layer may further include rules for identifying the type of communication framework and rules to be applied to communications according to different communication frameworks. Example communication frameworks may include, but are not limited to, Representational state transfer (REST), Simple Object Access Protocol (SOAP), gRPC Remote Procedure Calls (gRPC), and the like.

As a non-limiting example, for communications according to gRPC, the extracted data may include the name of a function that is invoked by the Protocol Buffers layer (i.e., the translation layer for gRPC). Such function name data may proceed to be used to build the Protocol Buffers layer. As another non-limiting example, for communications according to REST (which does not involve invoking functions), the extracted data may include the name of a path that is invoked by the translation layer.

At S550, data is extracted from a translation layer. The translation layer may be responsible for translating data by structuring the data into a particular format for storage or other subsequent use. Like for the invocation layer, the data may be stored in a protocol-specific format that varies depending on the communication framework being utilized and, therefore, the rules for extracting data from the translation data may include different sets of rules for different communication frameworks.

As a non-limiting example for the layers noted above, when a remote procedure call used for communications between two computing interfaces is gRPC, the transport layer is a TCP layer, the application layer is a HTTP 2 layer, the invocation layer is a gRPC layer, and the translation layer may be a Protocol Buffers Layer.

At S560, the traffic is duplicated based on the data extracted at each layer as described above with respect to S520 through S550. In an embodiment, the traffic is duplicated by converting the extracted data into a unified data modeling format. The unified data modeling format includes data related to the traffic which is protocol-agnostic, that is, the data is formatted such that subsequent use and processing of the data does not depend on the protocols which are used to communicate the data.

It should be noted that the extraction of data described above with respect to S520 through S550 includes extracting data from specific layers, but that the disclosed embodiments are not necessarily limited to these specific layers. In at least some other embodiments, data may be extracted from more or different layers than the layers mentioned above.

Figure 6:
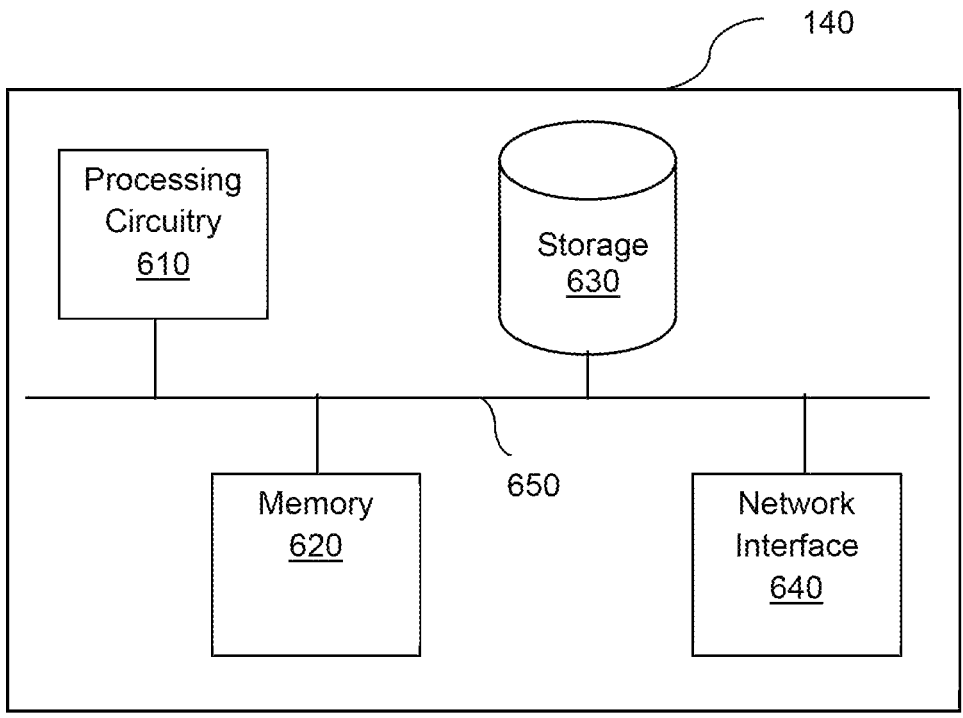
FIG. 6 is a schematic diagram of a static vulnerability detector according to an embodiment.

FIG. 6 is an example schematic diagram of a static vulnerability detector 140 according to an embodiment. The detector 140 includes a processing circuitry 610 coupled to a memory 620, a storage 630, and a network interface 640. In an embodiment, the components of the detector 140 may be communicatively connected via a bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 640 allows the detector 140 to communicate with, for example, the internal services 120, the external services 130, the admin device 150, the out of band sensor 160 combinations thereof, and the like.

It should be understood that the embodiments described herein are not limited to the specific architecture illustrated in FIG. 6, and other architectures may be equally used without departing from the scope of the disclosed embodiments.

It should be noted that various embodiments discussed herein are described with respect to gateways such as API gateways, but that the disclosed embodiments are not necessarily limited specifically to cloud components which are referred to as gateways. The disclosed embodiments may be equally applicable to accessing other types of cloud components which may route requests and responses to or through computing interfaces such as, but not limited to, load balancers.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. More-over, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for static analysis, comprising:
accessing a cloud component in order to obtain a plurality of configurations, wherein the cloud component is used to route requests to a plurality of computing interfaces, wherein a computing interface is a shared boundary across which two or more separate components of a computing environment exchange information, and wherein the plurality of configurations includes at least one set of instructions used for routing to at least one of the plurality of computing interfaces;
identifying dependencies of the plurality of computing interfaces by scanning each of the plurality of configu-rations, wherein each dependency is a reliance by the computing interface on a service provided by another component in the computing environment, wherein the dependencies are identified by applying dependency identification rules, wherein the dependency identifi-cation rules applied to at least first and second con-figurations differ depending on a type of resource implemented in the computing interface corresponding to the first or second configuration;
determining at least one path based on the identified dependencies, wherein each path includes at least one of the plurality of computing interfaces through which requests are routed; and
detecting a vulnerability among the plurality of comput-ing interfaces based on the determined at least one path.

2. The method of claim 1, further comprising:
taking a plurality of snapshots of a plurality of disks, each disk hosting a respective computing resource serving one of the plurality of computing interfaces, wherein obtaining the plurality of configurations further includes scanning the plurality of snapshots.

3. The method of claim 1, wherein the vulnerability is determined based further on traffic flows to and from each computing interface, further comprising:
correlating between at least one flow involving the com-puting interface caused by the identified dependencies and traffic of components in the computing environ-ment, wherein the vulnerability is detected based on the correlation.

4. The method of claim 1, further comprising:
correlating between at least one flow caused by the identified dependencies and hostile traffic in the com-puting environment in order to determine whether the hostile traffic is directed to a vulnerable component in the computing environment, wherein the vulnerability is detected based on the correlation.

5. The method of claim 1, wherein the detected vulner-ability is a vulnerability caused by a dependency on a known vulnerable service.

6. The method of claim 1, wherein the vulnerability is detected based on at least one vulnerability identified in the instructions of the plurality of configurations.

7. The method of claim 1, further comprising:
determining a utilization status of each of the dependen-cies, wherein each utilization status indicates whether the respective dependency is currently utilized, wherein the vulnerability is detected based further on the deter-mined utilization statuses.

8. The method of claim 7, further comprising:
creating a graph of connections among the plurality of computing interfaces based on the identified dependen-cies, wherein the utilization status of each of the dependencies is determined based further on the graph of connections among the plurality of computing inter-faces.

9. The method of claim 8, further comprising:
creating a cybersecurity posture of a computing environ-ment in which the cloud component is deployed based on the graph of connections, wherein the created cyber-security posture is a model of computing interfaces used for communications in or with the computing environment, wherein the computing interfaces used for communications in or with the computing environ-ment include the plurality of computing interfaces to which the cloud component routes requests.

10. A non-transitory computer readable medium having stored thereon instructions for causing a processing circuitry to execute a process, the process comprising:
accessing a cloud component in order to obtain a plurality of configurations, wherein the cloud component is used to route requests to a plurality of computing interfaces, wherein a computing interface is a shared boundary across which two or more separate components of a computing environment exchange information, and wherein the plurality of configurations includes at least one set of instructions used for routing to at least one of the plurality of computing interfaces;
identifying dependencies of the plurality of computing interfaces by scanning each of the plurality of configu-rations, wherein each dependency is a reliance by the computing interface on a service provided by another component in the computing environment, wherein the dependencies are identified by applying dependency identification rules, wherein the dependency identification rules applied to at least first and second configurations differ depending on a type of resource implemented in the computing interface corresponding to the first or second configuration;

determining at least one path based on the identified dependencies, wherein each path includes at least one of the plurality of computing interfaces through which requests are routed; and detecting a vulnerability among the plurality of computing interfaces based on the determined at least one path.

11. A system for static analysis, comprising: a processing circuitry; and a memory, the memory containing instructions that, when executed by the processing circuitry, configure the system to:

access a cloud component in order to obtain a plurality of configurations, wherein the cloud component is used to route requests to a plurality of computing interfaces, wherein a computing interface is a shared boundary across which two or more separate components of a computing environment exchange information, and wherein the plurality of configurations includes at least one set of instructions used for routing to at least one of the plurality of computing interfaces;

identify dependencies of the plurality of computing interfaces by scanning each of the plurality of configurations, wherein each dependency is a reliance by the computing interface on a service provided by another component in the computing environment, wherein the dependencies are identified by applying dependency identification rules, wherein the dependency identification rules applied to at least first and second configurations differ depending on a type of resource implemented in the computing interface corresponding to the first or second configuration;

determine at least one path based on the identified dependencies, wherein each path includes at least one of the plurality of computing interfaces through which requests are routed; and detect a vulnerability among the plurality of computing interfaces based on the determined at least one path.

12. The system of claim 11, wherein the system is further configured to:

take a plurality of snapshots of a plurality of disks, each disk hosting a respective computing resource serving one of the plurality of computing interfaces, wherein obtaining the plurality of configurations further includes scanning the plurality of snapshots.

13. The system of claim 11, wherein the vulnerability is determined based further on traffic flows to and from each computing interface, wherein the system is further configured to:

correlate between at least one flow involving the computing interface caused by the identified dependencies and traffic of components in the computing environment, wherein the vulnerability is detected based on the correlation.

14. The system of claim 11, wherein the system is further configured to:

correlate between at least one flow caused by the identified dependencies and hostile traffic in the computing environment in order to determine whether the hostile traffic is directed to a vulnerable component in the computing environment, wherein the vulnerability is detected based on the correlation.

15. The system of claim 11, wherein the detected vulnerability is a vulnerability caused by a dependency on a known vulnerable service.

16. The system of claim 11, wherein the vulnerability is detected based on at least one vulnerability identified in the instructions of the plurality of configurations.

17. The system of claim 11, wherein the system is further configured to:

determine a utilization status of each of the dependencies, wherein each utilization status indicates whether the respective dependency is currently utilized, wherein the vulnerability is detected based further on the determined utilization statuses.

18. The system of claim 17, wherein the system is further configured to:

create a graph of connections among the plurality of computing interfaces based on the identified dependencies, wherein the utilization status of each of the dependencies is determined based further on the graph of connections among the plurality of computing interfaces.

19. The system of claim 18, wherein the system is further configured to:

create a cybersecurity posture of a computing environment in which the cloud component is deployed based on the graph of connections, wherein the created cybersecurity posture is a model of computing interfaces used for communications in or with the computing environment, wherein the computing interfaces used for communications in or with the computing environment include the plurality of computing interfaces to which the cloud component routes requests.

* * * * *